(12) United States Patent
Gould et al.

(10) Patent No.: US 12,248,852 B2
(45) Date of Patent: Mar. 11, 2025

(54) DECISION ARCHITECTURE FOR AUTONOMOUS SYSTEMS

(71) Applicant: Intel Corporation, Santa Clara, CA (US)

(72) Inventors: Helen Adrienne Frances Gould, Portland, OR (US); Ignacio Javier Alvarez Martinez, Portland, OR (US); David W. Browning, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1657 days.

(21) Appl. No.: 16/456,167

(22) Filed: Jun. 28, 2019

(65) Prior Publication Data

US 2019/0318265 A1    Oct. 17, 2019

(51) Int. Cl.
| | | |
|---|---|---|
| *G06F 9/455* | (2018.01) | |
| *B60W 60/00* | (2020.01) | |
| *G06F 21/00* | (2013.01) | |
| *G06F 21/62* | (2013.01) | |
| *G06N 20/00* | (2019.01) | |
| *G06N 3/084* | (2023.01) | |

(52) U.S. Cl.
CPC .......... *G06N 20/00* (2019.01); *G06F 9/45558* (2013.01); *G06F 21/6245* (2013.01); *G06F 2009/45587* (2013.01); *G06N 3/084* (2013.01)

(58) Field of Classification Search
CPC .... G06N 20/00; G06N 3/084; G06F 9/45558; G06F 21/6245; G06F 2009/45587; G06F 2009/4557; G06F 21/00; B60W 60/00188

USPC .......................................................... 701/23
See application file for complete search history.

(56) References Cited

U.S. PATENT DOCUMENTS

| | | | | |
|---|---|---|---|---|
| 11,157,003 | B1* | 10/2021 | Patel .................... | G08G 5/0013 |
| 11,169,532 | B2* | 11/2021 | Anderson ............ | G05D 1/0221 |
| 11,875,177 | B1* | 1/2024 | Hayes ................. | G06F 9/45558 |
| 2010/0228427 | A1* | 9/2010 | Anderson ............. | B60W 30/09 |
| | | | | 701/1 |

(Continued)

OTHER PUBLICATIONS

Sifakis et al., Trustworthy Autonomous System Development, Published Apr. 2023 ACM, pp. 1-24 (pdf).*

(Continued)

*Primary Examiner* — Manglesh M Patel
(74) *Attorney, Agent, or Firm* — Schwegman Lundberg & Woessner, P.A.

(57) ABSTRACT

Various systems and methods implement a decision architecture for autonomous systems. An autonomous system framework includes a safety ring configured to interface with safety features of an autonomous system; a security ring configured to provide authentication and verification services to transactions passed through the security ring; a privacy ring configured to ensure privacy of a user of the autonomous system; a trustworthiness ring configured to log and provide transparency of transactions passed through the trustworthiness ring; and a well-being ring configured to interface with the user and provide feedback and information to the user on a state of the autonomous system, wherein: each of the safety, security, privacy, trustworthiness, and well-being rings include at least one interface to at least one other of the safety, security, privacy, trustworthiness, and well-being rings.

22 Claims, 13 Drawing Sheets

(56) References Cited

U.S. PATENT DOCUMENTS

| | | | | |
|---|---|---|---|---|
| 2014/0136414 | A1* | 5/2014 | Abhyanker | G05D 1/0255 701/25 |
| 2015/0331422 | A1* | 11/2015 | Hartung | G05D 1/02 701/23 |
| 2017/0139411 | A1* | 5/2017 | Hartung | H04L 12/40 |
| 2018/0183873 | A1* | 6/2018 | Wang | G05D 1/0088 |
| 2018/0220309 | A1* | 8/2018 | Gomes | G05D 1/0022 |
| 2018/0338001 | A1* | 11/2018 | Pereira Cabral | H04L 67/141 |
| 2018/0348763 | A1* | 12/2018 | Jiang | G05D 1/0088 |
| 2019/0258251 | A1* | 8/2019 | Ditty | G06V 20/58 |
| 2019/0378363 | A1* | 12/2019 | Becker | G05D 1/0221 |
| 2020/0026546 | A1* | 1/2020 | Lee | G05D 1/0287 |
| 2020/0326967 | A1* | 10/2020 | Hayes | G06F 9/45558 |
| 2021/0109538 | A1* | 4/2021 | Graefe | H04W 4/38 |
| 2021/0300418 | A1* | 9/2021 | Alvarez | G08G 1/096741 |
| 2022/0126864 | A1* | 4/2022 | Moustafa | G06T 1/0007 |

OTHER PUBLICATIONS

Unece, Framework document on automated/autonomous vehicles, Published Nov. 2021 World Forum for Harmonization of Vehicle Regulations, pp. 1-7 (pdf).*

Chattopadhyay et al., Autonomous Vehicle: Security by Design, Published Nov. 2021 IEEE, pp. 1-15 (pdf).*

Sabaliauskaite et al., AVES—Automated Vehicle Safety and Security Analysis Framework, Published Oct. 8, 2019 ACM, pp. 1-8 (pdf).*

Cui et al., Collaborative Analysis Framework of Safety and Security for Autonomous Vehicles, published Oct. 11, 2019 IEEE Access, pp. 1-12 (pdf).*

Boumiza et al., Intrusion Threats and Security Solutions for Autonomous Vehicle Networks, published 2017 IEEE, pp. 1-8 (pdf).*

"Vehicle Cybersecurity", NHTSA https: www.nhtsa.gov technology-innovation vehicle-cybersecurity, (Accessed on Nov. 27, 2019), 5 pgs.

"General Data Protection Regulation", Wikipedia https: en.wikipedia.org wiki General_Data_Protection_Regulation, (Accessed on Nov. 27, 2019), 17 pgs.

"ISO 26262", Wikipedia https: en.wikipedia.org wiki ISO_26262, (Accessed on Nov. 27, 2019), 5 pgs.

"Industrial Internet of Things vol. G4: Security Framework", IIC:PUB:G4:V1.0:PB:20160926, (2016), 173 pgs.

"Ethically Aligned Design", IEEE, 16 pgs.

Awad, Edmond, "The Moral Machine experiment", https: doi.org 10.1038 s41586-018-0637-6 Nature, (2018), 20 pgs.

McLeod, Saul, "Maslow's Hierarchy of Needs", Simply Psychology, (2018), 14 pgs.

* cited by examiner

SAFETY RING — 1002

|  | UNSAFE | SAFE |
|---|---|---|
| KNOWN | 2 | 1 |
| UNKNOWN | 3 | 4 |

SECURITY RING — 1004

|  | UNSECURE | SECURE |
|---|---|---|
| KNOWN | 2 | 1 |
| UNKNOWN | 3 | 4 |

PRIVACY RING — 1006

|  | NOT PRIVATE | PRIVATE |
|---|---|---|
| KNOWN | 2 | 1 |
| UNKNOWN | 3 | 4 |

TRUSTWORTHINESS RING — 1008

|  | NOT TRUSTWORTHY | TRUSTWORTHY |
|---|---|---|
| KNOWN | 2 | 1 |
| UNKNOWN | 3 | 4 |

WELL-BEING RING — 1010

|  | DOES NOT ENABLE WELL-BEING | DOES ENABLE WELL-BEING |
|---|---|---|
| KNOWN | 2 | 1 |
| UNKNOWN | 3 | 4 |

FIG. 10

|  | NOT PRIVATE | PRIVATE |
|---|---|---|
| HAZARD SEVERITY (S) | S3 = 10 | S0 = 1 |
| HAZARD LIKELIHOOD (L) | L4 = 10 | L1 = 1 |
| HAZARD URGENCY (U) | U3 = 10 | U0 = 1 |
| HAZARD SUBTOTAL (S x L x U) | 1000 | 1 |
| CONFIDENCE LEVEL (CL) | CL3 = 75% | CL3 = 75% |
| HAZARD TOTAL (HAZARD x CL) | 750 | 0.75 |

*FIG. 11*

DECISION ARCHITECTURE FOR AUTONOMOUS SYSTEMS

TECHNICAL FIELD

Embodiments described herein generally relate to computing devices, and in particular, to a decision architecture for autonomous systems.

BACKGROUND

Autonomous systems, such as autonomous vehicles, may operate largely without human direction. Instead, such systems rely on programming, configuration, sensor data, feedback systems, and other inputs to a decision system to operate independently. The decision system uses inputs and goals to produce a decision result, which may initiate a responsive action.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 10 is a block diagram illustrating rings and their corresponding realm domains, according to an embodiment;

FIG. 11 is a block diagram illustrating an example of risk evaluation, according to an embodiment;

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Designing and configuring decision-making systems involves a balance of practicality, engineering feasibility, human ethics, bottom-line costs, and other factors. There are often conflicting priorities between engineers, programmers, product management, end users, regulation authorities, and others making design of such systems highly complex.

Decision systems may be used in a semi-autonomous or fully-autonomous machine. An ever evolving example is an autonomous vehicle. A fully autonomous vehicle may be used as taxi, for instance. When used in this capacity, the vehicle may encounter a situation where a decision between two less than optimal choices. For example, an autonomous vehicle may come upon a stalled vehicle in the travel lane and have to decide whether to crash into the stalled vehicle, which may have passengers, or swerve into oncoming traffic. The decision system will react according to its programming and configuration. It is preferable that the underlying decision architecture be implemented using an accepted and defensible decision algorithm.

For decades, science fiction writers, futurists, psychologists, robotics researchers, philosophers, and ethicists have explored human motivations and how humans and intelligent autonomous machines/systems (including robots and artificial intelligence (AI)) interact and what guidelines are needed to govern such behavior. More recently, organizations have begun development on various standards that address security, privacy, trustworthiness, and safety in autonomous system operation. Other organizations have attempted to codify ethical operation of autonomous and intelligent systems.

However, none of the existing constructs have integrated policies for systems of systems (SOS). Instead, previous attempts to prescribe autonomous system behavior and resultant actions are incomplete because they either focus solely on a single aspect (e.g., security or safety) or focus solely on one type of human-machine interaction. What is needed is a holistic and comprehensive decision-making framework for autonomous operations.

This document describes a decision architecture that provides holistic technology solutions that address a comprehensive array of priorities from safety to security, privacy and trustworthiness, and overall well-being for humans. The decision architecture is useful as a guide for architects, engineers, data scientists, programmers, and others when considering tradeoffs in product features, platform capabilities, and market solutions. The decision architecture described herein is based on a hierarchy of needs with each need focusing on an operational aspect.

Figure 1:
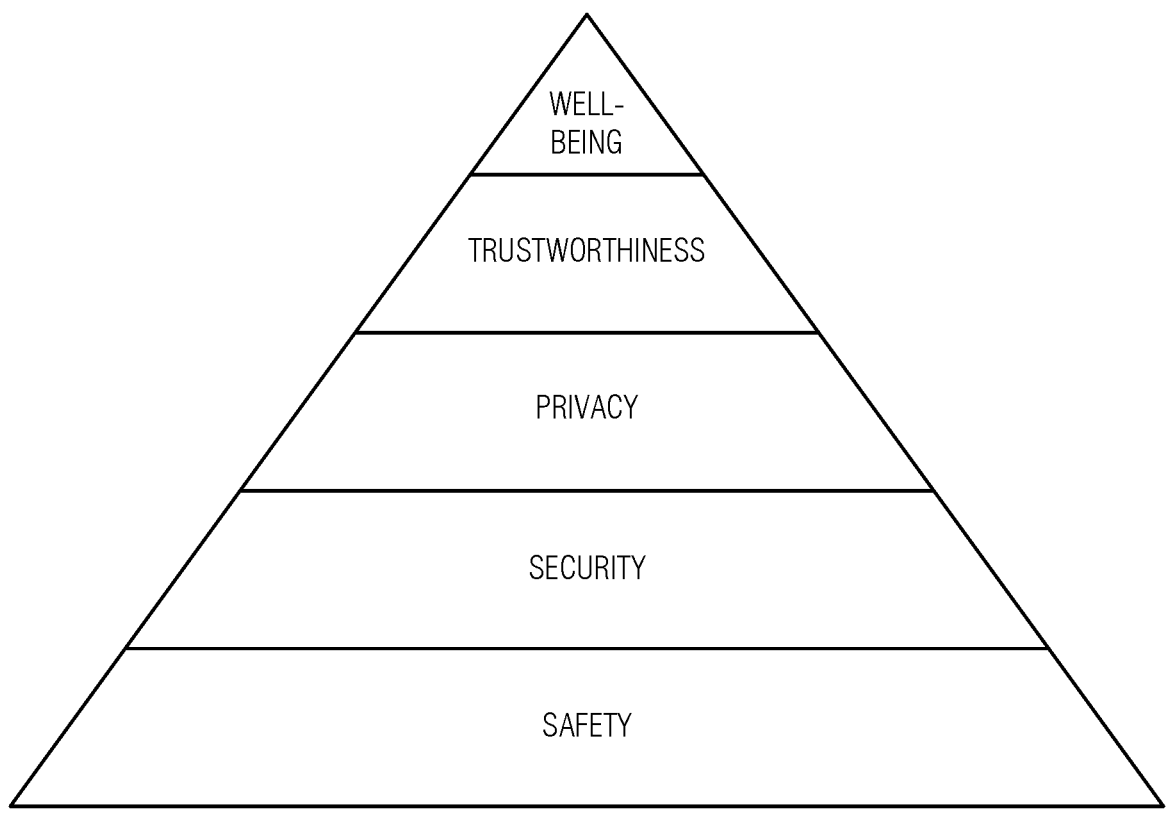
FIG. 1 is a diagram illustrating a high-tech hierarchy of needs, according to an embodiment.

FIG. 1 is a diagram illustrating a high-tech hierarchy of needs 100, according to an embodiment. The high-tech hierarchy 100 may be used by automated and autonomous systems and machines and provides a standardized and transparent framework for how such systems act. People who have a desire to know why a particular decision or action was made are able to use the high-tech hierarchy to identify the information used by the autonomous system when rendering the decision. Using the high-tech hierarchy 100 reduces or alleviates human misunderstanding or mistrust of autonomous systems and their operation.

At the base level is Safety. Safety is the highest priority in an autonomous system and is to protect and prevent accidents. The next layer up is Security. Security is a framework to protect from dangers of malicious activities by other people. The two base levels of Safety and Security represent basic needs of any autonomous system.

Built on top of these basic needs are layers representing psychological needs, including Privacy, Trustworthiness, and Well-being. Privacy is an aspect to protect information of the people using or around the autonomous system. Trustworthiness is an aspect that provides a reliable, dependable, unbiased, transparent, accurate, repeatable, and proven decision-making and responses. When humans have a greater understanding of what guidelines an autonomous system has been given or programmed to follow, then there is enhanced trust, as long as the system acts in a predictable fashion.

Figure 2:
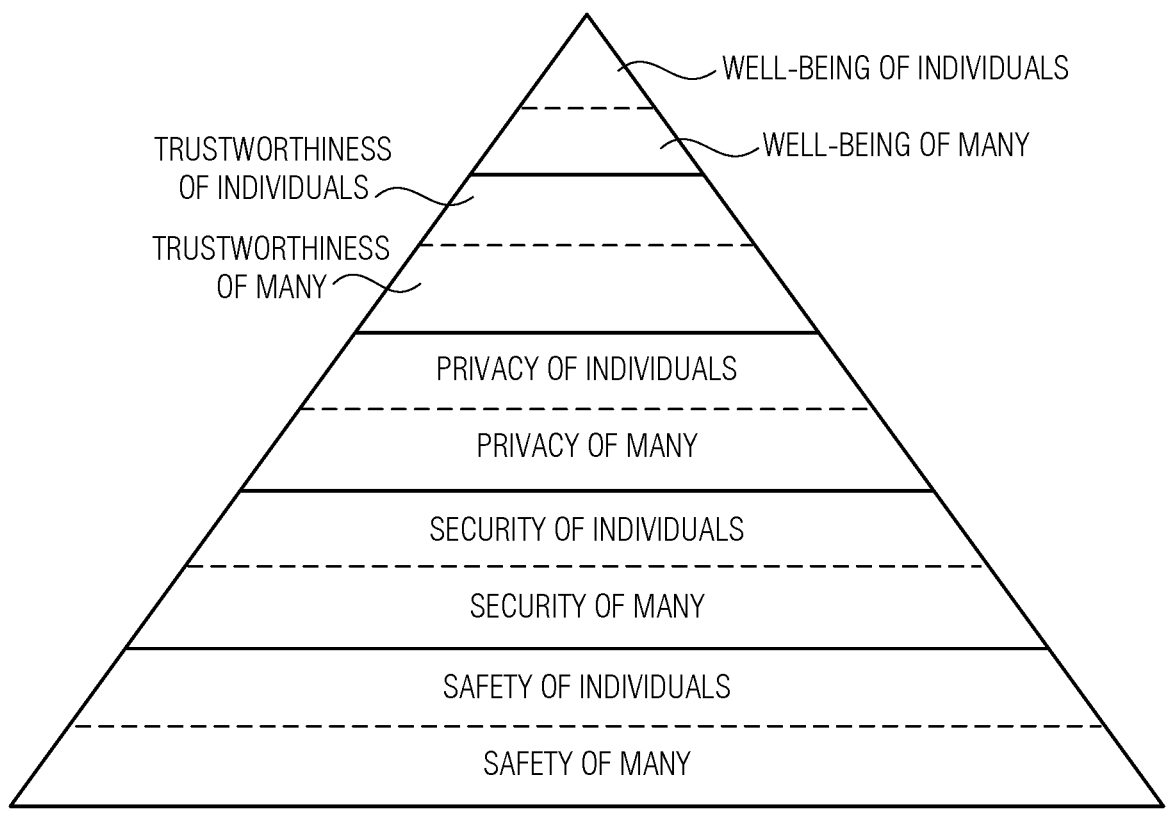
FIG. 2 is a diagram illustrating a detailed high-tech hierarchy of needs, according to an embodiment.

FIG. 2 is a diagram illustrating a detailed high-tech hierarchy of needs 200, according to an embodiment. It is generally accepted that actions that benefit many people are preferred over actions that only benefit a few people. Using this philosophy, the detailed high-tech hierarchy of needs 200 divides the Safety, Security, Privacy, Trustworthiness, and Well-being layers of the general high-tech hierarchy of needs 100 into one aspect that is focused on a large group of people and another aspect that is focused on individuals or some smaller group.

FIGS. 1 and 2 describe the high-tech hierarchy in terms that humans understand. To implement such policies and concepts into machines, a machine-intelligible architecture is provided here, which maps to the hierarchy described above.

Figure 3:
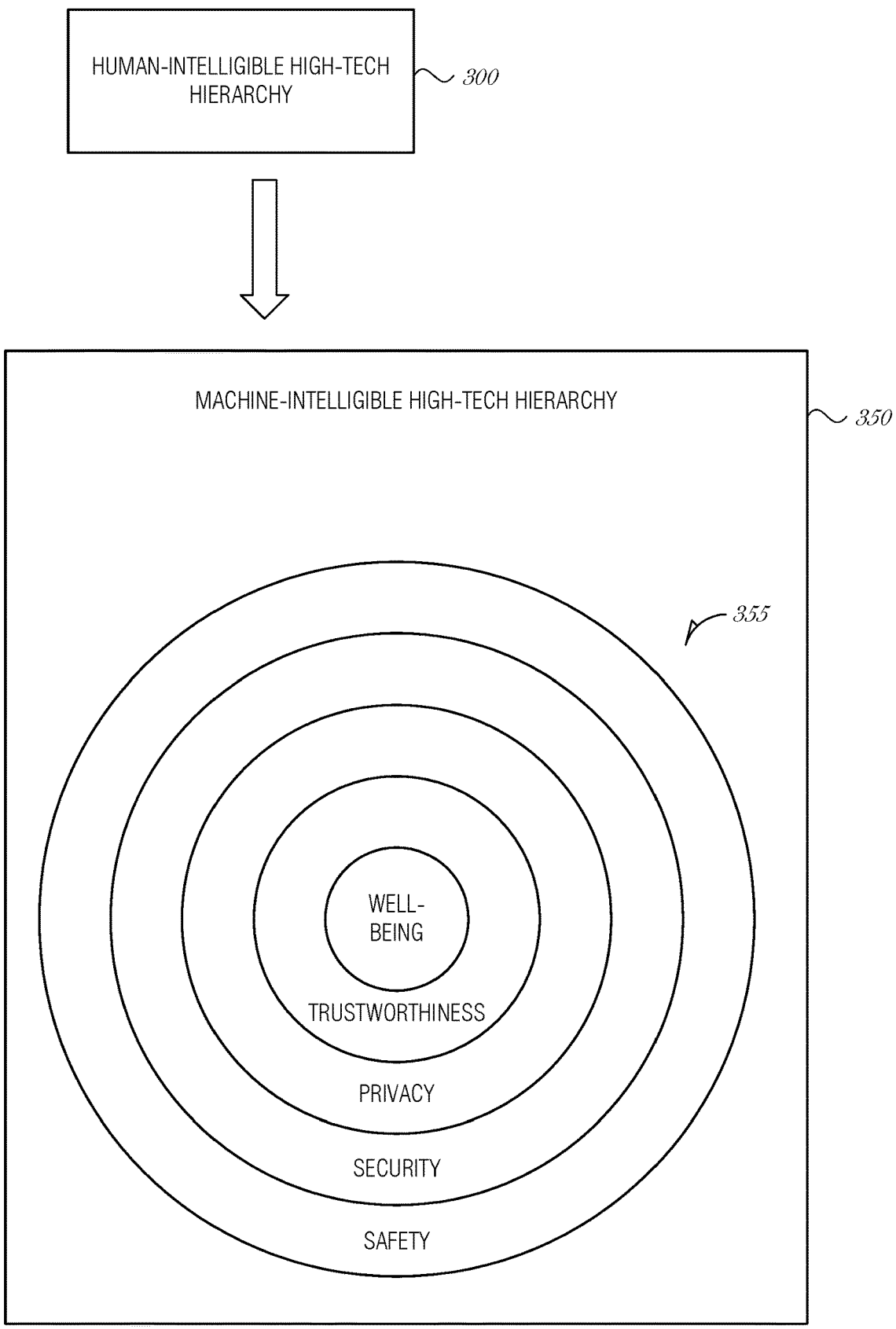
FIG. 3 is a block diagram illustrating the mapping between a human-intelligible high-tech hierarchy and a machine-intelligible high-tech architecture, according to an embodiment.

FIG. 3 is a block diagram illustrating the mapping between a human-intelligible high-tech hierarchy 300 and a machine-intelligible high-tech architecture 350, according to an embodiment. The human-intelligible high-tech hierarchy 300 may be composed of the layers discussed in FIGS. 1 and 2, including Safety, Security, Privacy, Trustworthiness, and Well-being. The machine-intelligible high-tech architecture 350 implements these layers with a "ring implementation." The ring implementation 355 includes concentric rings that represent the layers from the human-intelligible high-tech hierarchy 300. Each ring operates independently but may exchange messages with adjacent rings. Messages primarily move from the outer rings toward the center. However, there is no restriction on message direction and some messages may move from the interior rings to exterior rings.

Messages from one ring (sender ring) may be addressed to another ring (destination ring). Messages are transmitted from ring-to-ring until the message reaches the destination ring. Intermediary rings that relay messages may examine the message and perform an action based on the message. Each sender ring has a priority, which is tagged to the message. Ring priorities may be represented in a numerical format, such as 1, 2, 3, . . . , n, with 1 being the highest priority and descending from there. Alternative prioritization schemes may be used, such as with a highest numerical value being the highest priority, or with letters or other alphanumeric representations.

At the destination ring, messages are processed according to their associated ring priority. For instance, if messages are received at approximately the same time and are to be processed, a message from a Safety layer with ring priority 1 (e.g., highest) is processed before a message from a Privacy layer with ring priority 3. In addition, an interrupt request process may be used to interrupt ongoing processing of one ring message when another ring message with higher priority is received. By providing prioritized messaging and interrupt handling, user confidence in the system is increased. This confidence may be verified and reinforced by the Trustworthiness layer, which may provide tracking and logging of various actions. This transparency, accounting, and validation gives the user the ability to understand system operations and ultimately become more comfortable with and trusting of its operation.

Figure 4:
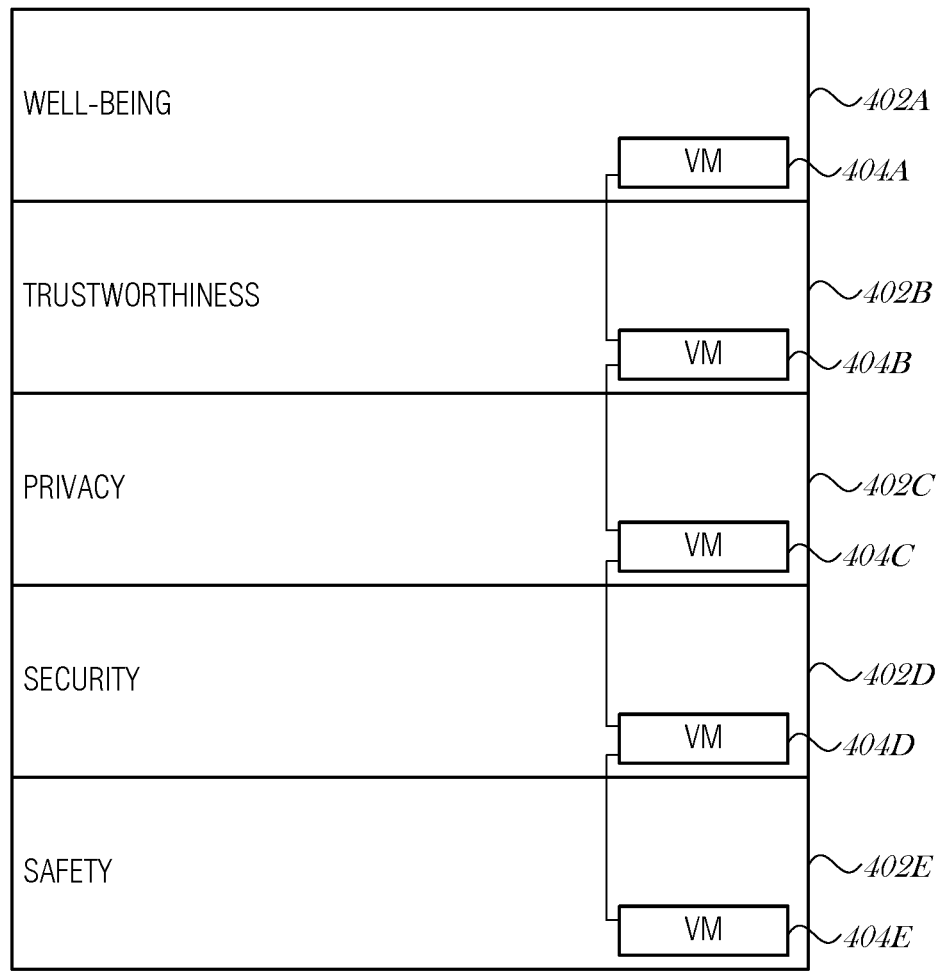
FIG. 4 is a block diagram illustrating a ring architecture, according to an embodiment.

FIG. 4 is a block diagram illustrating a ring architecture 400, according to an embodiment. The rings 402A-E in the ring architecture 400 are illustrated as horizontal layers in this diagram, but it is understood that the layers correspond to the pyramid and ring architectures described elsewhere in this document (e.g., FIGS. 1-3).

In the ring architecture 400 of FIG. 4, the highest priority ring 402A is illustrated at the top of the stack and the lowest priority ring 402E is illustrated at the bottom of the stack. Each ring 402A-E may be implemented through the use of a virtual machine (VM) executing on a host computer. The VMs 404A-E of the rings 402A-E may execute on the same host computer or on different host computers. Some of the VMs may execute in specialized hardware, such as a field-programmable gate array (FPGA) or application-specific integrated circuit (ASIC). Some of the VMs may execute on mobile devices, in a cloud server system, in a data center, or at some other compute resource.

Each VM 404A-E includes communication programming to communicate from ring to ring. Additionally, some VMs 404A-E may include driver software to control a presentation device (e.g., a display, monitor, light array, speaker, or the like) to interface with a human operator. Some VMs 404A-E may include user interface software to present a user interface, receive user feedback or input, record or react to such input, or the like.

Each VM 404A-E may be specifically manufactured to perform functions for the corresponding ring. For instance, the VM 404A may be configured with functionality to perform operations related to safety. In an autonomous vehicle context, such functionality may be to actuate brakes when detecting an imminent collision. As such, the VM 404A may include device driver software and other programming instructions, data, or constructs to obtain sensor data (e.g., image data from a camera), analyze sensor data (e.g., perform image recognition), and interface with an ADAS (advanced driver assistance systems) system to actuate brakes. Continuing with such an example, the VM 404E may be configured to interface with a human operator and as such, may include software, instructions, or other constructs to control an electronic display and receive touchscreen input from the operator.

Figure 5:
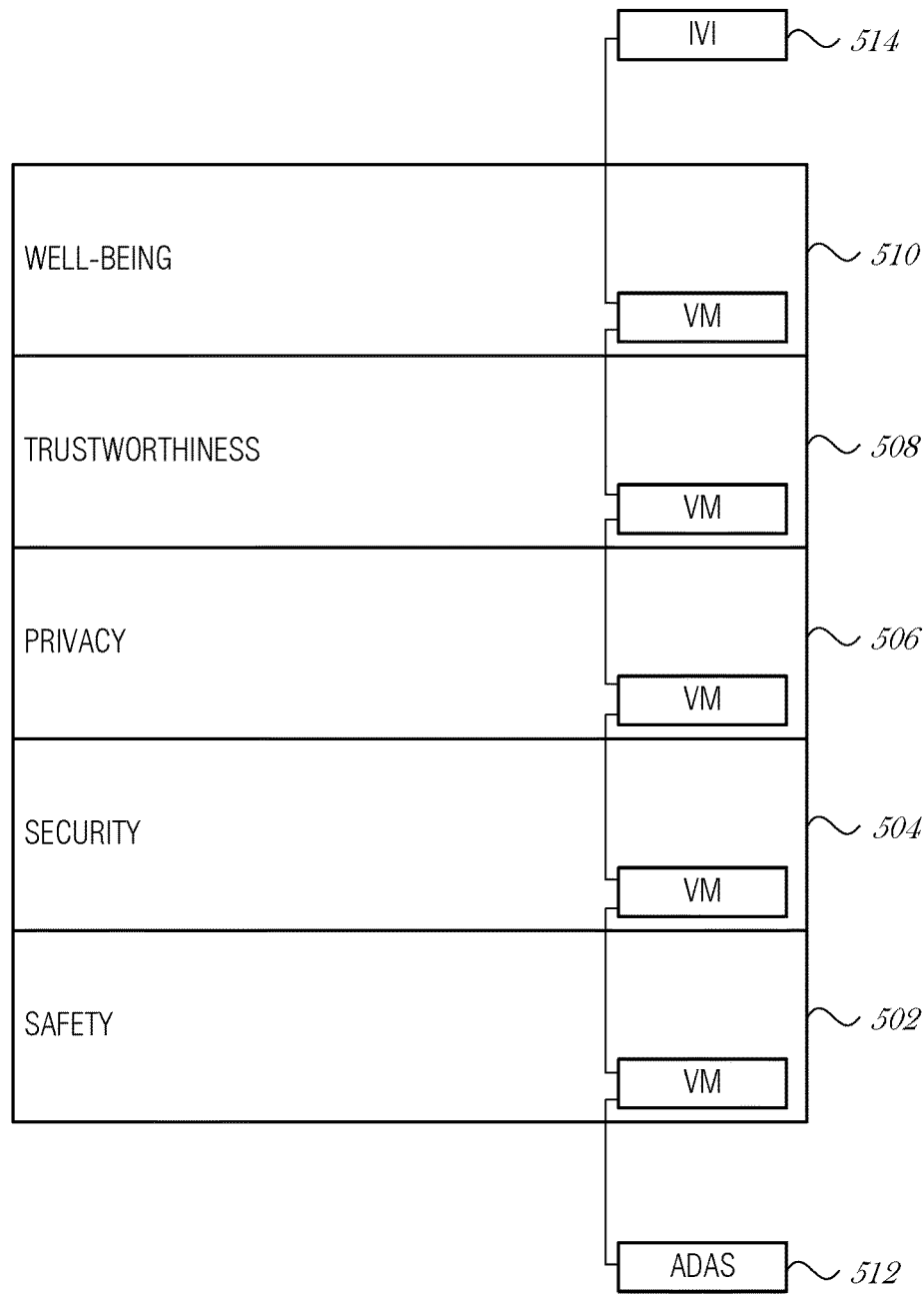
FIG. 5 is an example implementation of a ring architecture, according to an embodiment.

FIG. 5 is an example implementation 500 of a ring architecture, according to an embodiment. The implementation 500 is consistent with the framework described in FIGS. 1-2 and the architecture described in FIGS. 3-4. The implementation 500 is organized with a safety ring 502, a security ring 504, a privacy ring 506, a trustworthiness ring 508, and a well-being ring 510. Each ring 502-510 may include one or more virtual machines, hardware modules, software components, or other constructs to interface with an autonomous system (not shown). The autonomous system referred to in FIG. 5 is an autonomous vehicle (AV). It is understood that the implementation may be configured to work with other autonomous systems, which may include service robots, industrial robots, self-healing data centers, manufacturing systems, and the like.

The safety ring 502 is configured, programmed, or otherwise manufactured to manage safe operation of the autonomous system. In an autonomous vehicle context, the safety ring 502 may be adapted to interface with, or may be a component of, an ADAS controller (512). The safety ring 502 may directly or indirectly control various safety systems in the autonomous system. In an autonomous vehicle, safety systems may include braking control, steering control, in-dash warning systems, seat belts, air bags, and the like. In a manufacturing system, safety systems may include emergency shutdown controls, cooling or heating controls, or the like.

The security ring 504 is configured, programmed, or otherwise manufactured to manage aspects of security within the autonomous system such as validating software packages, encrypting or decrypting messages, maintaining public and private keys for various components in the autonomous system, or the like. In the autonomous vehicle context, the security ring 504 may manage over-the-air (OTA) configuration updates, firmware updates, application installation or removal, or the like.

The privacy ring 506 is configured, programmed, or otherwise manufactured to manage aspects of user privacy with respect to the autonomous system. The privacy ring 506 may be used to inspect incoming or outgoing data to ensure that it is privatized correctly to avoid exposure of sensitive data. For instance, the privacy ring 506 may be used to add or remove data from messages. The modifications may be made based on user preferences.

The trustworthiness ring 508 is configured, programmed, or otherwise manufactured to develop trust of the user with respect to the autonomous system. Trust is gained over time by monitoring system health and ensuring the system is operating as expected in a dependable fashion. Trust is also gained over time by providing sufficient information for the user to understand not only what happened, but also why it happened. Trust is also gained by way of transparency and completeness in any reporting, logging, informational dialogs, or other user interactions. Trust may be garnered through various aspects of logging and reporting of activities performed at other rings 502, 504, 506, or 510. As such, many of the messages from one ring to another ring may be captured and logged in the trustworthiness ring 508. The trustworthiness ring 508 may also perform other calculations to estimate the amount of user trust existing at a certain point and act on the amount of trust. For instance, as a user becomes more trusting of the autonomous system, fewer logs, alerts, or other information may be spontaneously provided. As the user gains trust, the user does not need to see reporting of every action, so fewer reports may be presented. The information may still be available to the user, but spontaneous presentations (e.g., dialog box) are suppressed or modified to avoid annoying the user, while still building trust.

The well-being ring 510 is configured, programmed, or otherwise manufactured to interface with the user and ensure user's well-being. In general, the feeling of well-being is a feeling of being healthy, happy, comfortable, or prosperous. To ensure a user's well-being, the well-being ring 510 provide access to data and information that inform the user of the autonomous system's operational state. In an embodiment, the well-being ring 510 interfaces with an in-vehicle infotainment (IVI) system (514). The IVI system may provide other functions, such as navigation, entertainment (e.g., radio), telephony, vehicle comfort controls (e.g., HVAC), or the like. The IVI system may be incorporated into a head unit or in-dash unit in a vehicle. In some instances, the IVI system may be incorporated, at least in part, in a mobile device or accessible by a mobile device, such as a mobile phone, smart key fob, or the like.

The well-being ring 510 also provides an interface for the user to provide feedback. The feedback may be positive or negative. When positive, the well-being ring 510 uses the feedback to reinforce actions performed at the well-being ring 510 or other rings. When negative, the well-being ring 510 uses the negative feedback to initiate corrections, report to another ring, log for future enhancements, or the like. When negative feedback is encountered, the well-being ring 510 may track the progress of any responsive actions so the user is able to identify what remedial actions are planned, are in progress, or have been performed to address the negative feedback.

Figure 6:
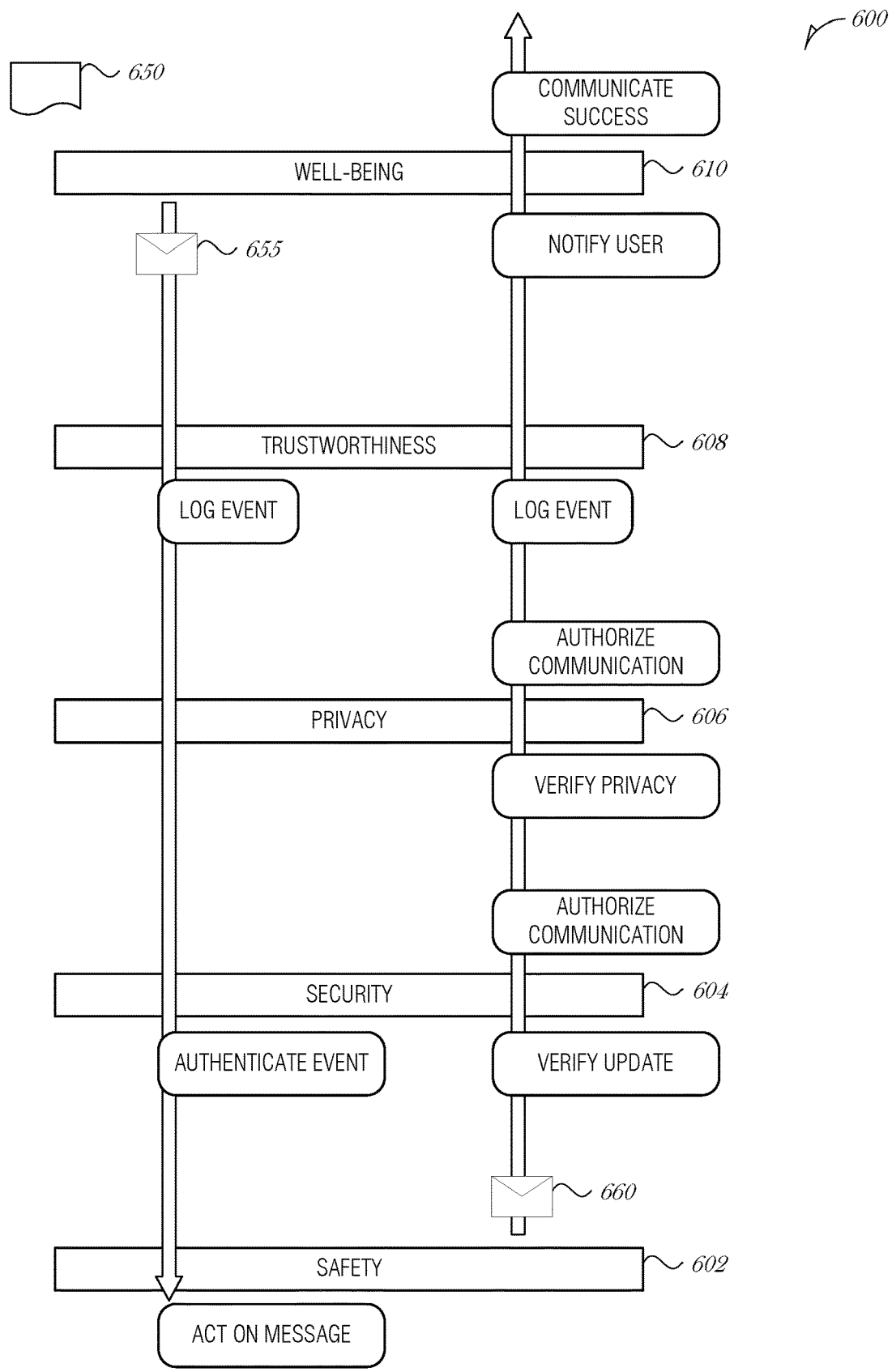
FIG. 6 is a message flow diagram illustrating a process of an over-the-air update, according to an embodiment.

FIG. 6 is a message flow diagram illustrating a process 600 of an over-the-air update, according to an embodiment. The layers (e.g., rings) of the architecture illustrated in FIG. 5 each have communication subsystems to communicate with one or more layers in the architecture. Message passing may be performed using any protocol, the details of which are not provided here. At a minimum, the protocol supports messages that have fields that include sender, recipient, timestamp, priority, and payload data. The payload data may be in the form of a type-length-value (TLV) field, where some m bits are reserved to indicate a data type, n bits are reserved to indicate a length of the data field, and p bits are reserved for the data itself. Alternatively, the payload data may be arranged as name:value pairs with x bits reserved to indicate an enumerated or actual data name and y bits reserved to indicate an enumerated value or an actual value. Other types of data packet organization may be used and this discussion is non-limiting.

The process 600 illustrated in FIG. 6 is in the context of a software update being received and applied to an ADAS in an autonomous vehicle. A well-being layer 610 receives a wireless update 650 from a remote source (not shown). The well-being ring 610 may include various driver software or other components to interface with a radio, communication circuitry, processing circuitry, memory, or other hardware to receive the wireless update 650 package over a wireless connection. The remote source may be a manufacturer, after-market service provider, or other service provider. The contents of the update 650 may include configuration changes to the ADAS, security fixes, feature enhancements, bug fixes, or the like to be used by the ADAS to reprogram or reconfigure itself.

The well-being ring 610 analyzes the communication that includes the update 650 and determines that it is intended for the safety ring 602. The well-being ring 610 creates a message 655 and transmits it toward the safety ring 602. The message 655 is transmitted through each of the intermediate rings including the trustworthiness ring 608, privacy ring 606, and security ring 604, on its way to the safety ring 602.

As each intermediate ring receives and forwards the message 655, the ring may analyze the message to determine whether it should take an action. The determination to take an action may be based on the type of message, the message contents, the sender, the receiver, message metadata, system state, or other information. For instance, the trustworthiness ring 608 may record a log entry that the message 655 was received by the well-being ring 610 and was sent to the safety ring 602 with a timestamp and other information (e.g., description of update, version of update, etc.). The trustworthiness ring 608 may further initiate its own action (e.g., produce or present report to a user) depending on how the trustworthiness ring 608 is configured to enhance user trust in the system.

In the process 600 shown in FIG. 6, as the message 655 is passed through the security ring 604, the security ring 604 may act on the message 655 or its contents, for example, to authenticate the update 650. The authentication may be performed by analyzing a signature used to digitally sign the update 650. The security ring 604 may perform other security functions, such as authenticating or validating the source or destination of the message 655, validating a checksum or signature applied to the message 655 by the sender (e.g., well-being ring 610), validating user preferences (e.g., whether the user has authorized updates to occur), or the like. If the security ring 604 determines that the message 655 is invalid or determines that something else is deficient, the security ring 604 may reject the message 655 and send a response back to the sender (e.g., well-being ring 610). In such an instance, the trustworthiness ring 608 may capture the exception message from the security ring 604 and log the event. The well-being ring 610 may interface with a user interface device, such as a display, to inform the user that an attempt to apply an invalid update was detected and isolated.

In the example illustrated in FIG. 6, the message 655 is a valid message and is passed on from the security ring 604 to the destination ring (e.g., the safety ring 602). The safety ring 602 may perform some validity checks of its own, for instance, to ensure that message is in a format that is compatible with the system. The safety ring 602 may then check that the system is in a state to apply the update (e.g., that the automobile is not currently being driven) and apply the update. After applying the update, a return status message 660 is transmitted back to the well-being ring 610. The return status message 660 indicates whether the update was successful or not, and may include other information about the update (e.g., which modules were updates, which versions were used, etc.).

As the return status message 660 is propagated back through the rings, each ring may analyze or act on it. For instance, the security ring 604 may verify that the update was successful. The security ring 604 may authorize communications from the higher priority rings to the lower priority rings. The privacy ring 606 may verify that the status message 660 does not include any private information that that user may not want to be exposed. The privacy ring 606 may also authorize the further transmission of the status message 660 toward the destination ring (e.g., the well-being ring 610). The trustworthiness ring 608 may log the event. The well-being ring 610 may notify the user of the return status message 660 or its contents. The well-being ring 610 may also communicate with the originator of the update to indicate that a successful installation or update was applied.

While the example illustrated in FIG. 6 is partially external to the ADAS in an autonomous vehicle, the general framework of a high-tech hierarchy may be applied within a given technology space. For instance, the high-tech hierarchy may be used within an ADAS.

ADAS includes the general areas of perception, modeling, planning, and actuation. Perception is achieved using various environmental sensors, such as a radar, lidar, cameras, maps, accelerometers, GPS, and the like. Modeling fuses sensor data and creates a semantic understanding of the environment. Planning is used to analyze routes, responsive options, predict future state of the vehicle, trajectory calculations, and the like. Planning may use machine-learning to determine a possibility of a hazard (e.g., a collision) and an optimal response (e.g., brake and steering avoidance). Actuation is used to execute the plan with vehicle controls, for example to brake, accelerate, steer, actual light signals, provide occupant warnings, stabilize the platform (e.g., safe maneuvering), etc.

A diagnostics and fault management subsystem may be used to monitor the various components of the ADAS that implement the perception, modeling, planning, or actuation operations. In order for the processes running on the automated driving vehicle to support the high-tech hierarchy framework they need to provide real-time information to a novel process running under the diagnostics and fault management monitoring service. Diagnostics and fault management monitoring are good mechanisms to build trustworthiness.

The fundamental difference of a monitoring system supporting the high-tech hierarchy principles is novel operational domain analysis on the system performance that is carried out in a sequential manner according to the high-tech hierarchy framework. Operational logs from the real-time functioning of all the automated driving subsystems are fed into the high-tech hierarchy process monitoring and undergo a series of logical checks that determine if requirements are met in the areas of safety, security, privacy, trustworthiness, and well-being. When any requirements are not met, appropriate responses are initiated towards the human user to make transparent the operational deficiencies or towards the actuation system to improve on a detected flaw or emergency.

Figure 7:
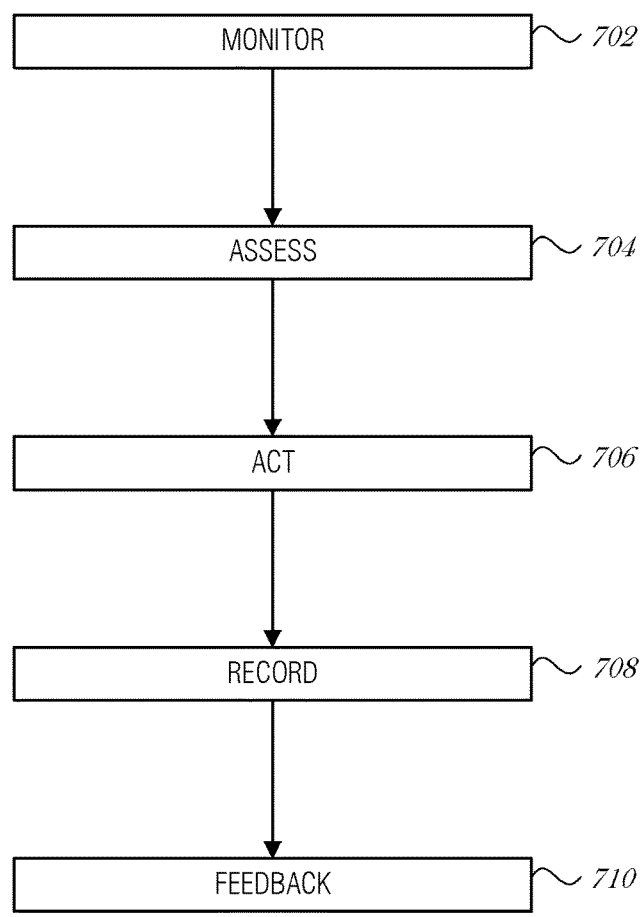
FIG. 7 is a block diagram illustrating a process for event processing, according to an embodiment.
Figure 8:
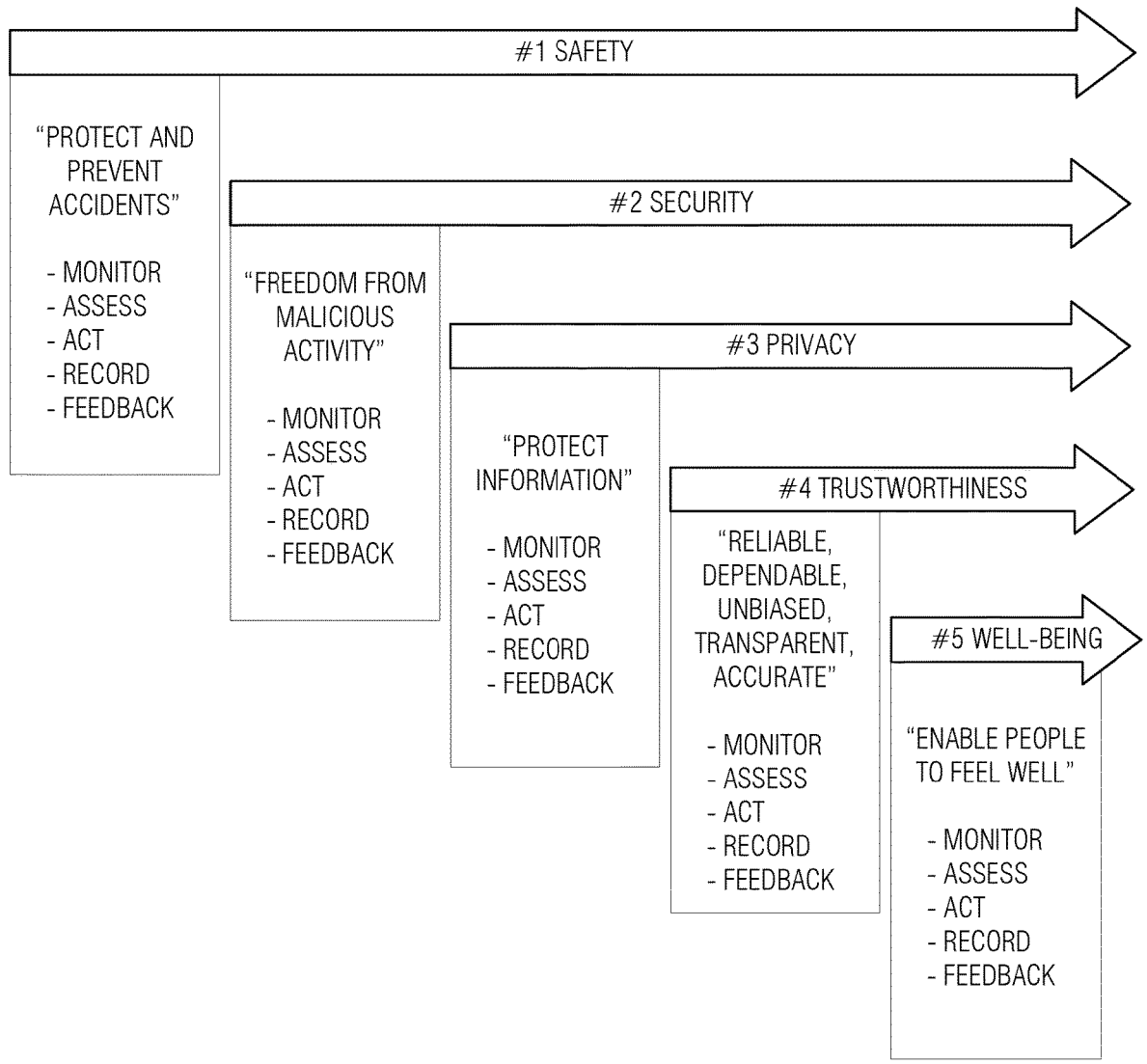
FIG. 8 is a diagram illustrating the functionality of rings in the architecture, according to an embodiment.

FIG. 7 is a block diagram illustrating a process 700 for event processing, according to an embodiment. The process 700 includes the operations of 1) monitoring 702, 2) assessing 704, 3) acting 706, 4) recording 708, and 5) feedback 710. The process 700 may be used by any of the rings (layers) of the high-tech hierarchy framework, as shown in FIG. 8.

Monitoring 702 is used to detect that an event exists that needs to be assessed further. An event may be categorized based on previously-collected information, past events, user configuration, or other information. Monitoring may be performed at each of the rings (e.g., Safety, Security, Privacy, Trustworthiness, and Well-Being). If one ring detects an event, then an indication of the event may be broadcast to other rings. Each ring may independently evaluate whether to take action in view of the event.

The assessment operation 704 is used to evaluate the event for various factors, such as the likelihood of the event, the potential damage or injury the event may cause, the urgency of any decision, the potential responsive options, or other aspects. For instance, depending on the type of event, the likelihood of it causing minimal damage or injury, the responsive action may be more moderate than if the likelihood of injury were higher or with more injurious outcomes.

The action operation 706 is the phase in the process 700 where the ring or layer may perform an action. Depending on the result of the assessment operation 704, the action operation 704 may be omitted if there is no action to be taken, as determined in the assessment operation 704.

The record operation 708 records the details of the monitoring 702, assessment 704, or action 706 operations. Recording is performed to ensure transparency and accountability of the performance of the high-tech hierarchy.

The feedback operation 710 is used to solicit feedback from a user where appropriate, and reinforce decision making processes at the assessment 704 or action 706 operations.

Figure 9:
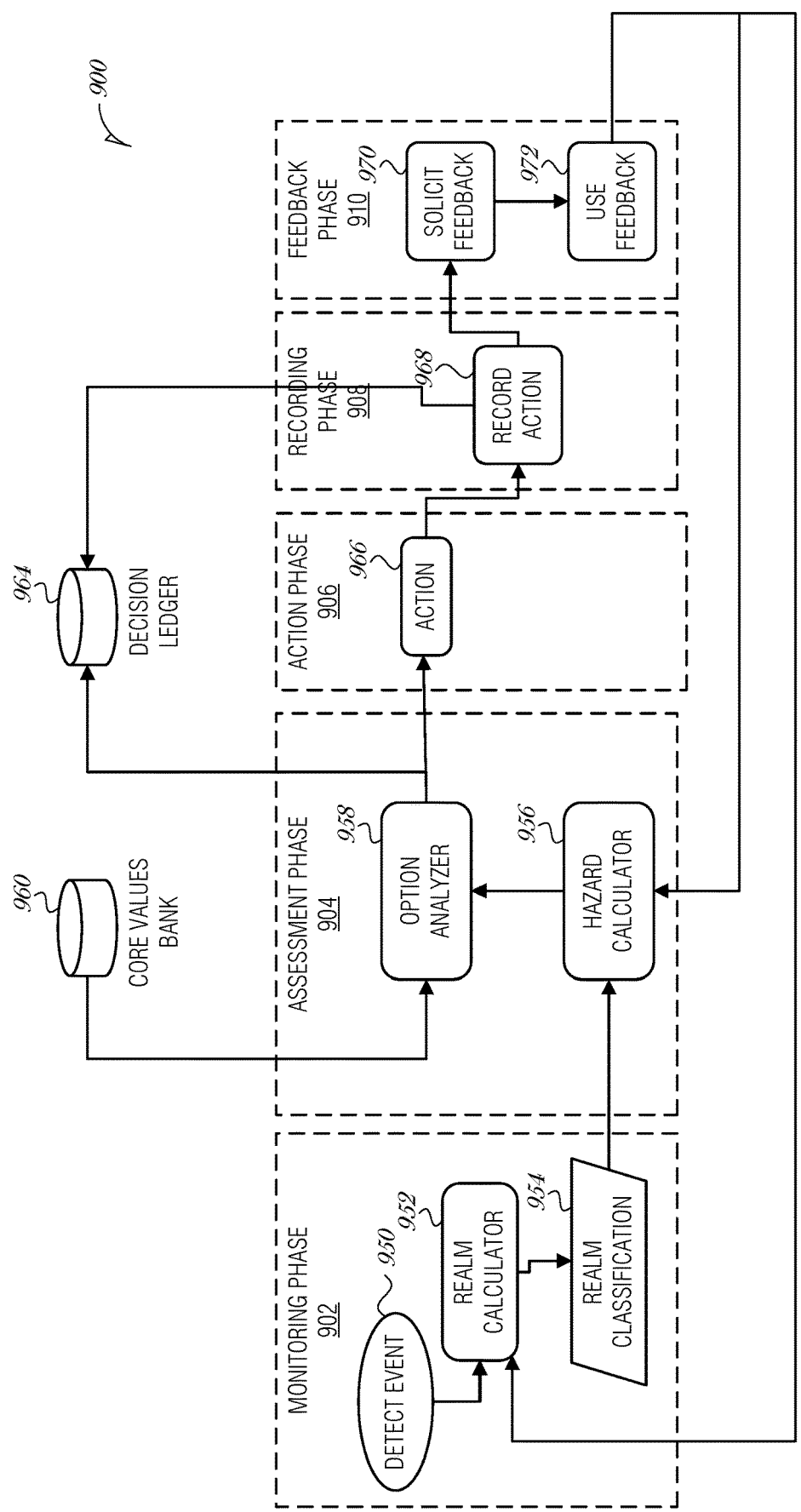
FIG. 9 is a block diagram illustrating an assessment and response flow, according to an embodiment.

FIG. 9 is a block diagram illustrating an assessment and response flow 900, according to an embodiment. The assessment and response flow 900 is divided into phases including a monitoring phase 902, an assessment phase 904, an action phase 906, a recording phase 908, and a feedback phase 910. These phases 902-910 align with the operations 702-710 from FIG. 7.

In the monitoring phase 902, an event is detected (950) and an indication of the event is passed to a realm calculator 952. The realm calculator 952 classifies the event into one of four categories: 1) known event and acceptable outcome, 2) known event and unacceptable outcome, 3) unknown event and unacceptable outcome, and 4) unknown event and acceptable outcome. An event is considered "known" if the event is similar to one that has been observed or detected before by the realm calculator 952. An outcome is considered acceptable based on the context of the ring and the realm calculator 952.

As illustrated in FIG. 10, a realm calculator 952 implemented in a safety ring 1002 may evaluate the event as having either "safe" or "unsafe" outcome. In contrast, a realm calculator 952 implemented in a security ring 1004 may evaluate the event as having either "secure" or "unsecure" outcome. A realm calculator 952 implemented in a privacy ring 1006 may evaluate the event as having either "private" or "not private" outcome. A realm calculator 952 implemented in a trustworthiness ring 1008 may evaluate the event as having either "trustworthy" or "untrustworthy" outcome. A realm calculator 952 implemented in a well-being ring 1010 may evaluate the event as having either "enabled well-being" or "did not enable well-being" outcome.

The realm calculator 952 is an essential logical element for a machine or autonomous system to assess if the situation being encountered is "known" (has been experienced before) or "unknown" (has not been encountered before); and if the prior outcome experienced was "acceptable" (outcome positive) or "unacceptable" (outcome not positive). Over time, more information is gathered and the machine/system will continue to "learn." The Known domain (especially of acceptable outcomes) will increase relative to the Unknown domain. This is accomplished through a feedback loop. While there is a possibility of having a situation from the Unknown domain, where it is also not apparent if the outcome will be "acceptable" or "unacceptable," in this situation the assumption is typically that the unknown-unacceptable decision logic will be followed.

After the realm calculator 952 determines whether the event is classified into a realm classification 954 (e.g., Known or Unknown domain with acceptable or unacceptable outcomes), a hazard calculator 956 calculates the potential impact or severity of outcomes from the event. The hazard calculator 956 may also calculate a level of urgency. These factors are used in a weighted formula to calculate a hazard metric, which is used to determine the responsive action.

The hazard calculator 956 combines a severity of an unacceptable outcome, a likelihood of such an outcome, an urgency of response, and a confidence level. The severity may be classified into levels, tiers, or ranks of severity ranging from no severity (e.g., no injuries if unacceptable outcome occurs) to critical severity (e.g., loss of life or fatal injuries). In an embodiment, the severity levels include:
S0—None—no injuries,
S1—Light—light to moderate injuries,
S2—Severe—life-threatening injuries that are survivable, and
S3—Critical—life-threatening injuries that are not survivable.

Other tiers or levels of severity may be used without departing from the scope of this disclosure. In an embodiment, the severity levels are based on the Automotive Safety Integrity Level (ASIL) component of ISO 26262.

Risk Management recognizes that consideration of the severity of a possible injury is modified by how likely the injury is to happen. In general, a hazardous event is considered a lower risk if it is less likely to happen. Likelihood of an unacceptable outcome may be determined by various factors including how likely it is for an injury to occur and how controllable the system is around the event. Likelihood of an unacceptable outcome may be based on the combination of exposure and controllability. Exposure is the likelihood of the conditions under which a particular failure would result in a hazard. The range of the exposure component of likelihood may include:
E0—Incredibly unlikely (e.g., less than 3%),
E1—Very low probability (e.g., 3%-15%),
E2—Low probability (e.g., 15%-50%),
E3—Medium probability (e.g., 50%-90%), and
E4—High probability (e.g., 90%-95%).

It is understood that these percentage ranges are not limiting. Depending on the design of the system, other ranges may be used or more or fewer levels may be used.

The second part of the likelihood factor is controllability. Controllability is a measure of the probability that harm may be avoided when a hazardous event occurs. This condition might be due to actions by the driver or by external mechanisms. The range of controllability may include:
C0—Generally controllable,
C1—Simply controllable,
C2—Normally controllable, and
C3—Difficult to control.

Other tiers or levels of exposure and controllability may be used without departing from the scope of this disclosure. In an embodiment, the severity levels are based on the Automotive Safety Integrity Level (ASIL) component of ISO 26262.

In an alternative embodiment, a likelihood factor is used that is a general measure of likelihood of a safety hazard occurring based on the event. This may be determined using a history of events and associated hazards, rules, or other mechanisms.

In addition to severity and likelihood (e.g., exposure and controllability), the hazard calculator 956 determines an urgency of response. The urgency reflects how fast of a response is required by the system. In an embodiment, the urgency classifications include:
U0—more than sufficient time to assess, decide, and act
U1—likely have sufficient time to assess, decide, and act
U2—time-critical to assess, decide, and act
U3—high risk of insufficient time to assess, decide, and act The urgency of response may be based on the type of event detected. For example, in a potential collision, the urgency of response will be very high (e.g., U3) because there is likely imminent danger. In contrast, when a windshield wiper system fails, the urgency of response may be at U0 if there is no rain or snow, and the wipers are not active. When there is a snowstorm though, the urgency of response for a failed wiper system may be higher, such as U1 or U2. The urgency classification may be determined from historical data, which may be used to program rules or policies for the hazard calculator 956. Such rules may be stored in a core values bank 960, which is discussed further below.

The hazard calculator 956 also calculates a confidence level, which represents how confident the hazard calculator 956 is in its determination of severity, likelihood, or urgency. In an embodiment, the confidence level includes:
CL0—Very low confidence in estimations
CL1—Low confidence in estimations CL2—Medium confidence in estimations
CL3—High confidence in estimations Based on the severity, likelihood, urgency, and confidence level, the hazard calculator 956 determines a risk of potential hazard. If there is a relatively low risk of a potential hazard, then there may not be a responsive action. If there is a relatively high risk of a potential hazard, then there may be one or more responsive actions. The hazard calculator 956 provides the risk of the potential hazard to an option analyzer 958, which is used to determine whether to initiate one or more responsive actions.

Responsive actions are selected based on several factors. One factor is whether the triggering event is a known or unknown event, and if known, then whether the event is has acceptable or unacceptable outcome. If the event has a known acceptable outcome, then there may be no responsive action. Alternatively, if the event has an unacceptable outcome, whether it is from a known or unknown realm, then the option analyzer 958 may analyze options for responsive actions and select one or more to execute.

Another factor is the rules stored in the core values bank 960. The rules stored in the core values bank 960 control, at least to some extent, the decision making of the option analyzer 958. Rules reflect ethical evaluations. Ethics are the rules of conduct recognized in respect to a particular class of human actions or a particular group or culture. The rules may be jurisdictional, for example, to accommodate local laws, customs, or conventions. In some cases, the option analyzer 958 may not reference the core values bank 960 because of the type of triggering event, for example.

Rules in the core values bank 960 may be stored securely. For instance, the rules in the core values bank 960 may be encrypted, stored in a secure container, or otherwise protected so that the rules are not tampered with by bad actors. As new rules are promulgated, they may revise, replace, or add to existing rules in the core values bank 960.

When the option analyzer 958 renders a decision of the responsive action to be taken, the decision may be written to a decision ledger 964. The decision ledger 964 is a log that is tamperproof and persistent, and provides an immutable record of what information was used for the decision, what decision was made, and other information about the decision. The decision ledger 964 may be implemented in a blockchain or persistent memory to provide the persistence, tamperproof, and immutable characteristics. Having the decision ledger 964 helps reinforce the "Trustworthiness" of the high-tech hierarchy by providing tamperproof documentation.

A responsive action is performed (operation 966). The results of the action are recorded (operation 968) in the decision ledger 964. In some cases, feedback is solicited (operation 970) from a user (e.g., a vehicle operator) and the feedback is fed back into the system (operation 972) so the system may learn. For example, the feedback may be used to develop the Known domain. The feedback may be used to reinforce severity, likelihood, or urgency classifications for use in hazard risk calculations.

Product planners, looking at next generation silicon options, could test, validate and utilize this approach when evaluating product feature tradeoffs. For example, when designing the next automotive or industrial automation products, should Feature A that is needed for safety and/or Feature B that is needed for security and/or Feature C that is needed for privacy and/or Feature D that is needed for system reliability/resiliency and/or Feature E that customers might find desirable (provided their other needs have already been met) be included.

FIG. 11 is a block diagram illustrating an example of risk evaluation, according to an embodiment. The severity, likelihood, and urgency levels are enumerated in a range from 1 to 10, with 1 being the lowest severity, likelihood, or urgency, and 10 being the highest. FIG. 11 illustrated two contrasting situations—one of generally high risk and one of generally low risk. In the situation of generally high risk, each of the severity, likelihood, and urgency levels are at their maximum values (e.g., 10 out of 10). In a contrasting example, the low risk levels for severity, likelihood, and urgency are at their respective minimum values. Using a medium confidence level (CL3) with a 75% value, the two situations are contrasted with the hazard values of 750 and 0.75.

Based on the hazard total score, different actions may be taken. For a lower score, (e.g., less than 5 or less than 20), a minimal responsive action may be taken (e.g., reporting or logging). For a higher hazard total score (e.g., over 500), a more drastic responsive action may be taken.

Figure 12:
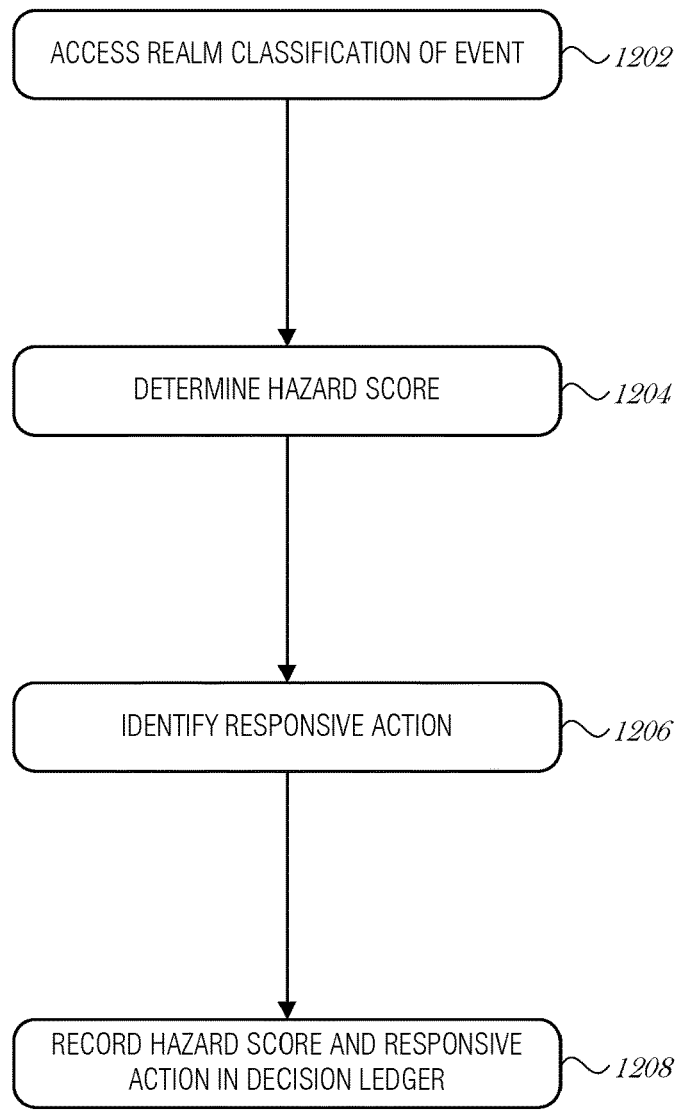
FIG. 12 is a flowchart illustrating a method 1200 for providing assessment and responses in an autonomous system, according to an embodiment.

FIG. 12 is a flowchart illustrating a method 1200 for providing assessment and responses in an autonomous system, according to an embodiment. At 1202, a realm classification of an event is accessed. In an embodiment, the realm classification is determined by analyzing the event and classifying the event into one of a known domain or an unknown domain, the known domain including recognized events and the unknown domain including unrecognized events.

At 1204, a hazard score is determined, where the hazard score is based on the realm classification, a severity metric, a likelihood metric, an urgency metric, and a confidence level metric.

In an embodiment, determining the hazard score comprises determining the severity metric based on the event. In a related embodiment, determining the hazard score comprises determining the likelihood metric based on the event. In another related embodiment, the likelihood metric includes an exposure metric. In another related embodiment, the likelihood metric includes a controllability metric. In an embodiment, determining the hazard score comprises determining the urgency metric based on the event.

In an embodiment, determining the hazard score comprises determining the confidence level metric based on the severity metric, the likelihood metric, the urgency metric, and the event.

In an embodiment, determining the hazard score comprises multiplying the severity metric, the likelihood metric, the urgency metric, and the confidence level metric.

At 1206, a responsive action is identified based on the hazard score. In an embodiment, identifying the responsive action includes obtaining a plurality of possible responsive actions, accessing a policy bank to obtain evaluation rules to evaluate the possible responsive actions, and selecting the responsive action based on, at least in part, the evaluation rules from the policy bank.

At 1208, details of the hazard score determination and the responsive action are recorded in a decision ledger. In an embodiment, recording details of the hazard score determination and the responsive action in the decision ledger includes accessing a blockchain and writing the details of the hazard score determination and the responsive action to the blockchain.

In an embodiment, the method 1200 includes classifying the event as having one of an acceptable outcome or an unacceptable outcome.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 13:
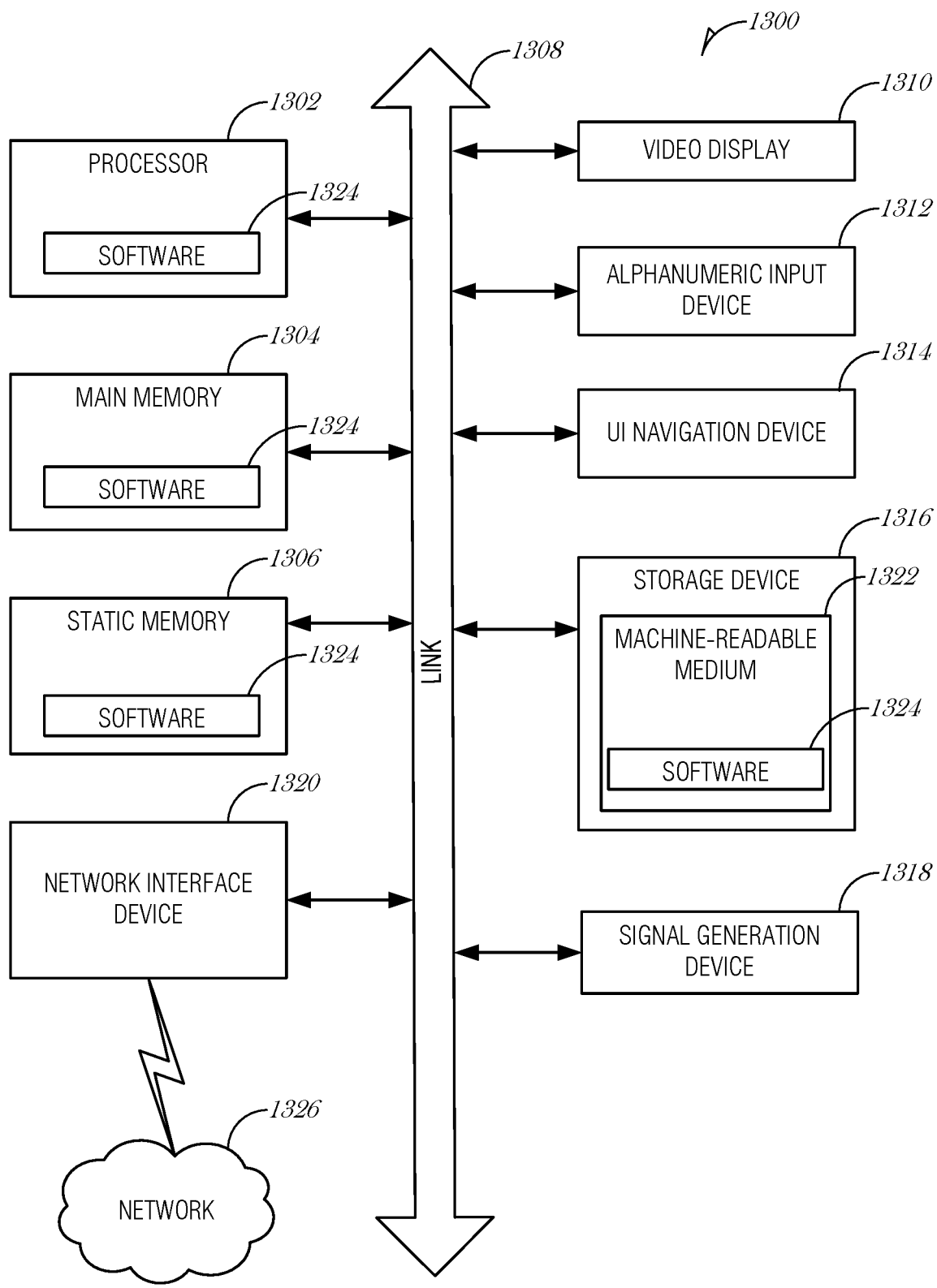
FIG. 13 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 13 is a block diagram illustrating a machine in the example form of a computer system 1300, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1300 includes at least one processor 1302 (e.g., a central processing unit (CPU), a graphics processing unit (GPU) or both, processor cores, compute nodes, etc.), a main memory 1304 and a static memory 1306, which communicate with each other via a link 1308 (e.g., bus). The computer system 1300 may further include a video display unit 1310, an alphanumeric input device 1312 (e.g., a keyboard), and a user interface (UI) navigation device 1314 (e.g., a mouse). In one embodiment, the video display unit 1310, input device 1312 and UI navigation device 1314 are incorporated into a touch screen display. The computer system 1300 may additionally include a storage device 1316 (e.g., a drive unit), a signal generation device 1318 (e.g., a speaker), a network interface device 1320, and one or more sensors (not shown), such as a global positioning system (GPS) sensor, compass, accelerometer, gyrometer, magnetometer, or other sensor.

The storage device 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304, static memory 1306, and/or within the processor 1302 during execution thereof by the computer system 1300, with the main memory 1304, static memory 1306, and the processor 1302 also constituting machine-readable media.

While the machine-readable medium 1322 is illustrated in an example embodiment to be a single medium, the term "machine-readable medium" may include a single medium or multiple media (e.g., a centralized or distributed database, and/or associated caches and servers) that store the one or more instructions 1324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1324 may further be transmitted or received over a communications network 1326 using a transmission medium via the network interface device 1320 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 is an autonomous system framework comprising: a safety ring configured to interface with safety features of an autonomous system; a security ring configured to provide authentication and verification services to transactions passed through the security ring; a privacy ring configured to ensure privacy of a user of the autonomous system; a trustworthiness ring configured to log and provide transparency of transactions passed through the trustworthiness ring; and a well-being ring configured to interface with the user and provide feedback and information to the user on a state of the autonomous system, wherein: each of the safety, security, privacy, trustworthiness, and well-being rings include, at least one interface to at least one other of the safety, security, privacy, trustworthiness, and well-being rings.

In Example 2, the subject matter of Example 1 includes, wherein the autonomous system comprises an autonomous vehicle.

In Example 3, the subject matter of Examples 1-2 includes, wherein the autonomous system comprises a service robot.

In Example 4, the subject matter of Examples 1-3 includes, wherein the interface in the safety, security, privacy, trustworthiness, or well-being ring are implemented using a virtual machine.

In Example 5, the subject matter of Examples 1-4 includes, wherein the interface in the safety, security, privacy, trustworthiness, or well-being ring includes a message transfer mechanism to exchange messages with another one of the safety, security, privacy, trustworthiness, or well-being rings.

In Example 6, the subject matter of Example 5 includes, wherein the message transfer mechanism of each of the safety, security, privacy, trustworthiness, and well-being rings include a prioritization scheme.

In Example 7, the subject matter of Example 6 includes, wherein the prioritization scheme prioritizes messages sent by the safety ring over any of the other rings.

In Example 8, the subject matter of Examples 6-7 includes, wherein the prioritization scheme includes ring priorities for each of the safety, security, privacy, trustworthiness, and well-being rings.

In Example 9, the subject matter of Examples 6-8 includes, wherein the message transfer mechanism is configured to transfer a message from a sender ring to a recipient ring, and the message is routed through any intermediate rings between the sender and recipient rings.

Example 10 is a method comprising: implementing an autonomous system framework comprising: a safety ring configured to interface with safety features of an autonomous system; a security ring configured to provide authentication and verification services to transactions passed through the security ring; a privacy ring configured to ensure privacy of a user of the autonomous system; a trustworthiness ring configured to log and provide transparency of transactions passed through the trustworthiness ring; and a well-being ring configured to interface with the user and provide feedback and information to the user on a state of the autonomous system, wherein each of the safety, security, privacy, trustworthiness, and well-being rings include, at least one interface to at least one other of the safety, security, privacy, trustworthiness, and well-being rings.

In Example 11, the subject matter of Example 10 includes, wherein the autonomous system comprises an autonomous vehicle.

In Example 12, the subject matter of Examples 10-11 includes, wherein the autonomous system comprises a service robot.

In Example 13, the subject matter of Examples 10-12 includes, wherein the interface in the safety, security, privacy, trustworthiness, or well-being ring are implemented using a virtual machine.

In Example 14, the subject matter of Examples 10-13 includes, wherein the interface in the safety, security, privacy, trustworthiness, or well-being ring includes a message transfer mechanism to exchange messages with another one of the safety, security, privacy, trustworthiness, or well-being rings.

In Example 15, the subject matter of Example 14 includes, wherein the message transfer mechanism of each of the safety, security, privacy, trustworthiness, and well-being rings include a prioritization scheme.

In Example 16, the subject matter of Example 15 includes, wherein the prioritization scheme prioritizes messages sent by the safety ring over any of the other rings.

In Example 17, the subject matter of Examples 15-16 includes, wherein the prioritization scheme includes ring priorities for each of the safety, security, privacy, trustworthiness, and well-being rings.

In Example 18, the subject matter of Examples 15-17 includes, wherein the message transfer mechanism is configured to transfer a message from a sender ring to a recipient ring, and the message is routed through any intermediate rings between the sender and recipient rings.

Example 19 is at least one machine-readable medium including instructions, which when executed by a machine, cause the machine to perform operations of any of the methods of Examples 10-18.

Example 20 is an apparatus comprising means for performing any of the methods of Examples 10-18.

Example 21 is an apparatus comprising: means for implementing an autonomous system framework comprising: a safety ring configured to interface with safety features of an autonomous system; a security ring configured to provide authentication and verification services to transactions passed through the security ring; a privacy ring configured to ensure privacy of a user of the autonomous system; a trustworthiness ring configured to log and provide transparency of transactions passed through the trustworthiness ring; and a well-being ring configured to interface with the user and provide feedback and information to the user on a state of the autonomous system, wherein each of the safety, security, privacy, trustworthiness, and well-being rings include, at least one interface to at least one other of the safety, security, privacy, trustworthiness, and well-being rings.

In Example 22, the subject matter of Example 21 includes, wherein the autonomous system comprises an autonomous vehicle.

In Example 23, the subject matter of Examples 21-22 includes, wherein the autonomous system comprises a service robot.

In Example 24, the subject matter of Examples 21-23 includes, wherein the interface in the safety, security, privacy, trustworthiness, or well-being ring are implemented using a virtual machine.

In Example 25, the subject matter of Examples 21-24 includes, wherein the interface in the safety, security, privacy, trustworthiness, or well-being ring includes a message transfer mechanism to exchange messages with another one of the safety, security, privacy, trustworthiness, or well-being rings.

In Example 26, the subject matter of Example 25 includes, wherein the message transfer mechanism of each of the safety, security, privacy, trustworthiness, and well-being rings include a prioritization scheme.

In Example 27, the subject matter of Example 26 includes, wherein the prioritization scheme prioritizes messages sent by the safety ring over any of the other rings.

In Example 28, the subject matter of Examples 26-27 includes, wherein the prioritization scheme includes ring priorities for each of the safety, security, privacy, trustworthiness, and well-being rings.

In Example 29, the subject matter of Examples 26-28 includes, wherein the message transfer mechanism is configured to transfer a message from a sender ring to a recipient ring, and the message is routed through any intermediate rings between the sender and recipient rings.

Example 30 is at least one machine-readable medium including instructions, which when executed by a machine, cause the machine to: implement an autonomous system framework comprising: a safety ring configured to interface with safety features of an autonomous system; a security ring configured to provide authentication and verification services to transactions passed through the security ring; a privacy ring configured to ensure privacy of a user of the autonomous system; a trustworthiness ring configured to log and provide transparency of transactions passed through the trustworthiness ring; and a well-being ring configured to interface with the user and provide feedback and information to the user on a state of the autonomous system, wherein each of the safety, security, privacy, trustworthiness, and well-being rings include, at least one interface to at least one other of the safety, security, privacy, trustworthiness, and well-being rings.

In Example 31, the subject matter of Example 30 includes, wherein the autonomous system comprises an autonomous vehicle.

In Example 32, the subject matter of Examples 30-31 includes, wherein the autonomous system comprises a service robot.

In Example 33, the subject matter of Examples 30-32 includes, wherein the interface in the safety, security, privacy, trustworthiness, or well-being ring are implemented using a virtual machine.

In Example 34, the subject matter of Examples 30-33 includes, wherein the interface in the safety, security, privacy, trustworthiness, or well-being ring includes a message transfer mechanism to exchange messages with another one of the safety, security, privacy, trustworthiness, or well-being rings.

In Example 35, the subject matter of Example 34 includes, wherein the message transfer mechanism of each of the safety, security, privacy, trustworthiness, and well-being rings include a prioritization scheme.

In Example 36, the subject matter of Example 35 includes, wherein the prioritization scheme prioritizes messages sent by the safety ring over any of the other rings.

In Example 37, the subject matter of Examples 35-36 includes, wherein the prioritization scheme includes ring priorities for each of the safety, security, privacy, trustworthiness, and well-being rings.

In Example 38, the subject matter of Examples 35-37 includes, wherein the message transfer mechanism is configured to transfer a message from a sender ring to a recipient ring, and the message is routed through any intermediate rings between the sender and recipient rings.

Example 39 is at least one machine-readable medium including instructions that, when executed by processing circuitry, cause the processing circuitry to perform operations to implement of any of Examples 1-38.

Example 40 is an apparatus comprising means to implement of any of Examples 1-38.

Example 41 is a system to implement of any of Examples 1-38.

Example 42 is a method to implement of any of Examples 1-38.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An autonomous system framework comprising:
   processing circuitry; and
   memory storing instructions executable by the processing circuitry, to cause the processing circuitry to perform operations that implement a plurality of rings in an autonomous system and control an autonomous machine based on transactions of the autonomous system, the plurality of rings comprising:
   a safety ring configured to interface with safety features of the autonomous system, the safety ring configured to perform safety operations on the transactions of the autonomous system;
   a security ring having an interface with the safety ring, the security ring configured to provide authentication and verification services for the transactions of the autonomous system passed from the safety ring through the security ring;
   a privacy ring having an interface with the security ring, the privacy ring configured to ensure privacy of a user of the autonomous system for the transactions of the autonomous system passed from the security ring through the privacy ring;
   a trustworthiness ring having an interface with the privacy ring, the trustworthiness ring configured to log and provide transparency for the transactions of the autonomous system passed from the privacy ring through the trustworthiness ring; and
   a well-being ring having an interface with the trustworthiness ring, the well-being ring configured to interface with the user and provide feedback and information to the user on a state of the autonomous system based on the transactions of the autonomous system passed from the trustworthiness ring through the well-being ring;
   wherein the interface included in the safety, security, privacy, trustworthiness, and well-being rings is implemented using at least one virtual machine; and
   wherein the interface included in the safety, security, privacy, trustworthiness, and well-being rings facilitates prioritized messaging among the plurality of rings.

2. The autonomous system framework of claim 1, wherein the autonomous machine comprises an autonomous vehicle.

3. The autonomous system framework of claim 1, wherein the autonomous machine comprises a service robot.

4. The autonomous system framework of claim 1, wherein the interface included in the safety, security, privacy, trustworthiness, and well-being rings includes a message transfer mechanism to exchange messages with another one of the safety, security, privacy, trustworthiness, or well-being rings.

5. The autonomous system framework of claim 4, wherein the message transfer mechanism of each of the safety, security, privacy, trustworthiness, and well-being rings include a prioritization scheme.

6. The autonomous system framework of claim 5, wherein the prioritization scheme prioritizes messages sent by the safety ring over any of the other rings.

7. The autonomous system framework of claim 5, wherein the prioritization scheme includes ring priorities for each of the safety, security, privacy, trustworthiness, and well-being rings.

8. The autonomous system framework of claim 5, wherein the message transfer mechanism is configured to transfer a message from a sender ring to a recipient ring, and the message is routed through any intermediate rings between the sender and recipient rings.

9. A method comprising:
   implementing an autonomous system framework comprising a plurality of rings, the plurality of rings comprising:
   a safety ring configured to interface with safety features of an autonomous system, the safety ring configured to perform safety operations on transactions of the autonomous system;
   a security ring having an interface with the safety ring, the security ring configured to provide authentication and verification services for the transactions of the autonomous system passed from the safety ring through the security ring;

a privacy ring having an interface with the security ring, the privacy ring configured to ensure privacy of a user of the autonomous system for the transactions of the autonomous system passed from the security ring through the privacy ring;

a trustworthiness ring having an interface with the privacy ring, the trustworthiness ring configured to log and provide transparency for the transactions of the autonomous system passed from the privacy ring through the trustworthiness ring; and a well-being ring having an interface with the trustworthiness ring, the well-being ring configured to interface with the user and provide feedback and information to the user on a state of the autonomous system based on the transactions of the autonomous system passed from the trustworthiness ring through the well-being ring;

wherein the interface included in the safety, security, privacy, trustworthiness, and well-being rings is implemented using at least one virtual machine; and wherein the interface included in the safety, security, privacy, trustworthiness, and well-being rings facilitates prioritized messaging among the plurality of rings; and controlling an autonomous machine based on the transactions of the autonomous system.

10. The method of claim 9, wherein the autonomous machine comprises an autonomous vehicle.

11. The method of claim 9, wherein the autonomous machine comprises a service robot.

12. The method of claim 9, wherein the interface included in the safety, security, privacy, trustworthiness, and well-being rings includes a message transfer mechanism to exchange messages with another one of the safety, security, privacy, trustworthiness, or well-being rings.

13. The method of claim 12, wherein the message transfer mechanism of each of the safety, security, privacy, trustworthiness, and well-being rings include a prioritization scheme.

14. The method of claim 13, wherein the prioritization scheme prioritizes messages sent by the safety ring over any of the other rings.

15. The method of claim 13, wherein the prioritization scheme includes ring priorities for each of the safety, security, privacy, trustworthiness, and well-being rings.

16. The method of claim 13, wherein the message transfer mechanism is configured to transfer a message from a sender ring to a recipient ring, and the message is routed through any intermediate rings between the sender and recipient rings.

17. At least one non-transitory machine-readable medium including instructions, which when executed by a machine, cause the machine to:

implement an autonomous system framework comprising:

a safety ring configured to interface with safety features of an autonomous system, the safety ring configured to perform safety operations on transactions of the autonomous system;

a security ring having an interface with the safety ring, the security ring configured to provide authentication and verification services for the transactions of the autonomous system passed from the safety ring through the security ring;

a privacy ring having an interface with the security ring, the privacy ring configured to ensure privacy of a user of the autonomous system for the transactions of the autonomous system passed from the security ring through the privacy ring;

a trustworthiness ring having an interface with the privacy ring, the trustworthiness ring configured to log and provide transparency for the transactions of the autonomous system passed from the privacy ring through the trustworthiness ring; and a well-being ring having an interface with the trustworthiness ring, the well-being ring configured to interface with the user and provide feedback and information to the user on a state of the autonomous system based on the transactions of the autonomous system passed from the trustworthiness ring through the well-being ring;

wherein the interface included in the safety, security, privacy, trustworthiness, and well-being rings is implemented using at least one virtual machine; and wherein the interface included in the safety, security, privacy, trustworthiness, and well-being rings facilitates prioritized messaging among the plurality of rings; and control an autonomous machine based on the transactions of the autonomous system.

18. The at least one machine-readable medium of claim 17, wherein the interface in the safety, security, privacy, trustworthiness, and well-being rings includes a message transfer mechanism to exchange messages with another one of the safety, security, privacy, trustworthiness, or well-being rings.

19. The at least one machine-readable medium of claim 18, wherein the message transfer mechanism of each of the safety, security, privacy, trustworthiness, and well-being rings include a prioritization scheme.

20. The at least one machine-readable medium of claim 19, wherein the prioritization scheme prioritizes messages sent by the safety ring over any of the other rings.

21. The at least one machine-readable medium of claim 19, wherein the prioritization scheme includes ring priorities for each of the safety, security, privacy, trustworthiness, and well-being rings.

22. The at least one machine-readable medium of claim 19, wherein the message transfer mechanism is configured to transfer a message from a sender ring to a recipient ring, and the message is routed through any intermediate rings between the sender and recipient rings.

\* \* \* \* \*